INVENTORS
EDWARD J. CUTTING
LESLIE G. BARLEY

United States Patent Office 3,378,319
Patented Apr. 16, 1968

3,378,319
THRUST BEARING ASSEMBLIES
Edward John Cutting, Shepperton, Middlesex, and Leslie George Barley, Hayes End, Middlesex, England, assignors to The Glacier Metal Company Limited, Wembley, England, a British company
Filed Sept. 7, 1965, Ser. No. 485,492
Claims priority, application Great Britain, Sept. 10, 1964, 37,103/64
9 Claims. (Cl. 308—160)

ABSTRACT OF THE DISCLOSURE

A tilting pad type thrust bearing in which the pads are spaced from one another on the carrier ring and wherein there is secured to the carrier ring in the space between each pair of pads a lubricant delivery device having at least one lubricant ejection aperture spaced from the leading edge of the appropriate adjacent pad and arranged to direct lubricant towards substantially the whole of the length of that leading edge.

---

This invention relates to thrust bearing assemblies of the kind comprising a support, for example a carrier ring, carrying an annular series of separate thrust pads the front faces of which (herein called working surfaces) constitute the bearing surface against which in use bears a co-operating annular bearing surface on a rotating member, usually in the form of a collar, and assumed herein to be a thrust collar rigid with a shaft the thrust of which is to be transmitted to the carrier ring. The invention is applicable to such thrust bearing assemblies whether of the type in which the thrust pads are mounted on the support in such a way that during operation they can tilt individually relatively to the support, or of the type in which, during operation, the thrust pads cannot tilt relatively to the support.

Such thrust bearings are lubricated with liquid, usually oil, although water or other liquids may be used in some cases, and power loss occurs in them due to viscous sheer of the lubricating liquid while, in addition, further losses, known as parasitic churning losses, take place and tend to cause heating of the lubricant, in addition to the heating caused by the relative rotation under thrust between the thrust collar and the pads and by reason of the viscous sheer and churning losses referred to.

The present invention has for an object to provide an improved thrust bearing assembly of the kind referred to in which the lubrication of the bearing assembly will be provided in a manner which will tend to reduce such power losses, the invention being particularly but not exclusively applicable to large thrust bearings rotating at high speeds say at speeds above 15,000 r.p.m.

In a thrust bearing assembly of the kind referred to according to the present invention, there is provided in combination with a supporting member carrying an annular series of separate thrust pads the leading and trailing edges of the working surfaces of which are separated circumferentially by spaces, lubricant delivery means for supplying lubricating liquid thereto arranged to inject such liquid into an area extending throughout substantially the whole length of the leading edge of each pad so that the lubricant flows between the leading edge of the pad and the thrust collar along substantially the whole of the leading edge of the pad.

Preferably, in addition, wiper means are provided arranged to impede the transfer of lubricating fluid from the trailing edge of each pad to the leading edge of the next pad so that lubricating liquid which has passed between the working face of one pad and the thrust collar does not then flow into the space between the working face of the next pad and the thrust collar.

Such wiper means conveniently include a wiper edge lying approximately in the plane of the working surfaces of the thrust pads and in this case the wiper edge is conveniently constituted by the edge of a wiper surface which may be the surface of a layer of white metal of other relatively soft bearing metal.

Thus each of such wiper surfaces may be formed on a part which lies in the space between the trailing edge of one pad and the leading edge of the next pad and which contains one or more delivery passages by which the lubricant is delivered into the area immediately in advance of and towards the leading edge of such next pad. In any case the lubricant may be delivered into this area by way of a slot or recess and/or a number of spaced delivery orifices and in such a slot may be formed as a recess in the edge portion of a wiper member remote from the wiping edge.

Moreover the wiper member is conveniently provided with a channel or channels extending radially whereby lubricating liquid which it wipes off the face of the thrust collar is caused to flow radially outwards away from the rotating parts. A circumferentially disposed discharge pipe may therefore be provided to receive and carry away the liquid from such radially extending channels.

In addition deflector plates may be provided and disposed circumferentially around the outer circumference of the annular series of thrust pads, such deflector plates being arranged so that, during operation of the bearing they are in line with oblique scraper edges at the appropriate edges of the wiper surfaces and so aligned with them that liquid passing away from the bearing by way of the radial channels is prevented from flowing circumferentially along the outer circumference of the thrust pads and thereby being transferred from pad to pad.

The delivery of lubricant to the lubricant delivery means between the thrust pads conveniently takes place through axially extending passages so that the overall diameter of the thrust bearing assembly is not increased as compared with an equivalent thrust bearing assembly without the special lubricant delivery means according to the invention.

The invention is particularly applicable to thrust bearings of the kind referred to in which the thrust pads are circumferentially spaced from one another by stop pins, which may also serve to prevent the thrust pads becoming detached from their support, and in this case each of the stop pins may be provided with an internal passage terminating in an exit orifice or two or more exit orifices facing towards the leading edge of the appropriate adjacent thrust pad whereby the lubricating liquid can be fed through the passages in the pins and out through the orifices the heads of the pins in directions towards the leading edges of the pads. Such an arrangement may be particularly suitable for example for thrust bearings for the kind in question of the smaller sizes where the available space is limited.

Where as in many of the arrangements described above, liquid lubricant feed means are arranged in parts which also act as scraper means such feed and scraper means may be resiliently mounted on the pad support to ensure that the wiper surfaces and/or wiper edges are maintained in close contact with the working surface of the thrust collar.

Various constructions according to the invention are shown by way of example somewhat diagrammatically in the accompanying drawings, in which.

Figure 1:
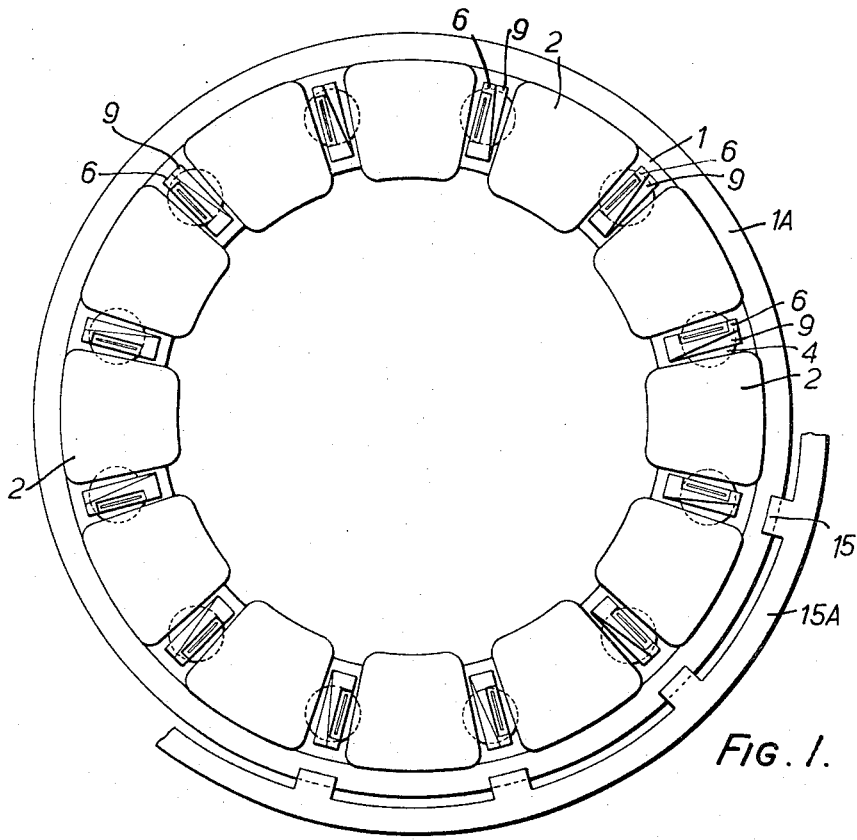
FIGURE 1 is a front elevation of a thrust bearing assembly according to the invention showing the annular support, the series of pads and the oil delivery means.
Figure 2:
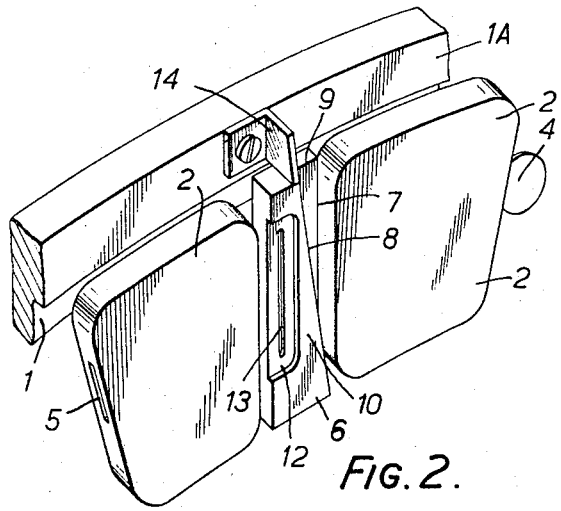
FIGURE 2 is a perspective view of part of the assembly shown in FIGURE 1 on an enlarged scale and in more detail showing an adjacent pair of pads and the associated lubricant feed and wiper means between them.
Figure 3:
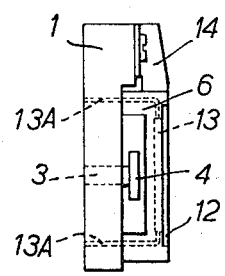
FIGURE 3 is a section on the line 3—3 of FIGURE 2 showing the manner in which the lubricant feed means bridge a pad locating pin.

In the construction shown in FIGURES 1, 2 and 3 the thrust bearing assembly comprises an annular supporting plate or carrier 1 which may be of conventional form and is secured in a manner known per se to a fixed member to which the thrust is to be transmitted, the annular carrier 1 having a rim 1A and having secured to one face thereof a series of thrust pads 2 which are spaced from one another circumferentially. Each of the pads 2 is secured to the carrier 1 by two pins 3 which lie in the spaces between the pad and the two adjacent pads and each of which comprises a stem 3A which passes through and is secured in the carrier 1 and a head 4 which is spaced somewhat from the adjacent face 1A of the carrier 1 and projects into slots 5 formed in the adjacent sides of the two adjacent pads, all in a manner generally similar to that employed in thrust bearings of the kind forming the subject of the present applicants' United States Patent No. 3,201,184.

It will be appreciated that the thrust bearing assembly shown in FIGURE 1 will be used in combination with a rotating member (not shown) in the form of a thrust collar, rigid with a shaft which is coaxial with the assembly, the working face of the thrust collar bearing during operation upon the working surfaces of the pads 2 in a manner well known per se and usual in such thrust bearings.

Disposed in each of the spaces between two adjacent thrust pads and secured to the carrier 1 is a combined lubricating fluid feed and wiper device comprising a member 6 which extends over the head 4 of the adjacent pin as shown in FIGURE 3 and has a leading edge portion 7 and an oblique step 8 which, with the leading edge portion 7, forms an outwardly radially extending channel 9 of increasing width from its inner to its outer end. The step 8 terminates at a scraper edge formed by the leading edge of a wiper surface 10, which may be formed of white metal, and during operation is intended to bear on the adjacent face of the thrust collar and therefore lies approximately in the same plane as the working surfaces of the pads 2.

Extending radially along the trailing edge of the wiper surface 10 is a recess 12 into which opens an exit orifice in the form of a slot 13 through which liquid lubricant can be delivered into the recess 12, the recess 12 being so shaped as to direct such liquid towards the leading edge of the pad adjacent to which the recess 12 lies.

Approximately in line with the face of the step 8 and disposed between the outer circumferential portion of each pad 2 is a baffle plate 14 forming part of the support for the member 6 and serving to prevent some at least of the oil coming from the trailing edge of the adjacent thrust pad from circulating around the periphery of the assembly and creating power absorbing eddies. Each of the baffles 14 also serves to guide the oil flowing outwards from the channel 9 into a discharge pipe indicated at 15 from which it flows into a peripheral main discharge pipe 15A common to the various individual discharge pipes 15. For convenience part only of the discharge pipe 15A is shown in FIGURE 1. Lubricant is fed to the slots 13 by passages 13A in the carrier 1 as indicated in FIGURE 3.

Figure 4:
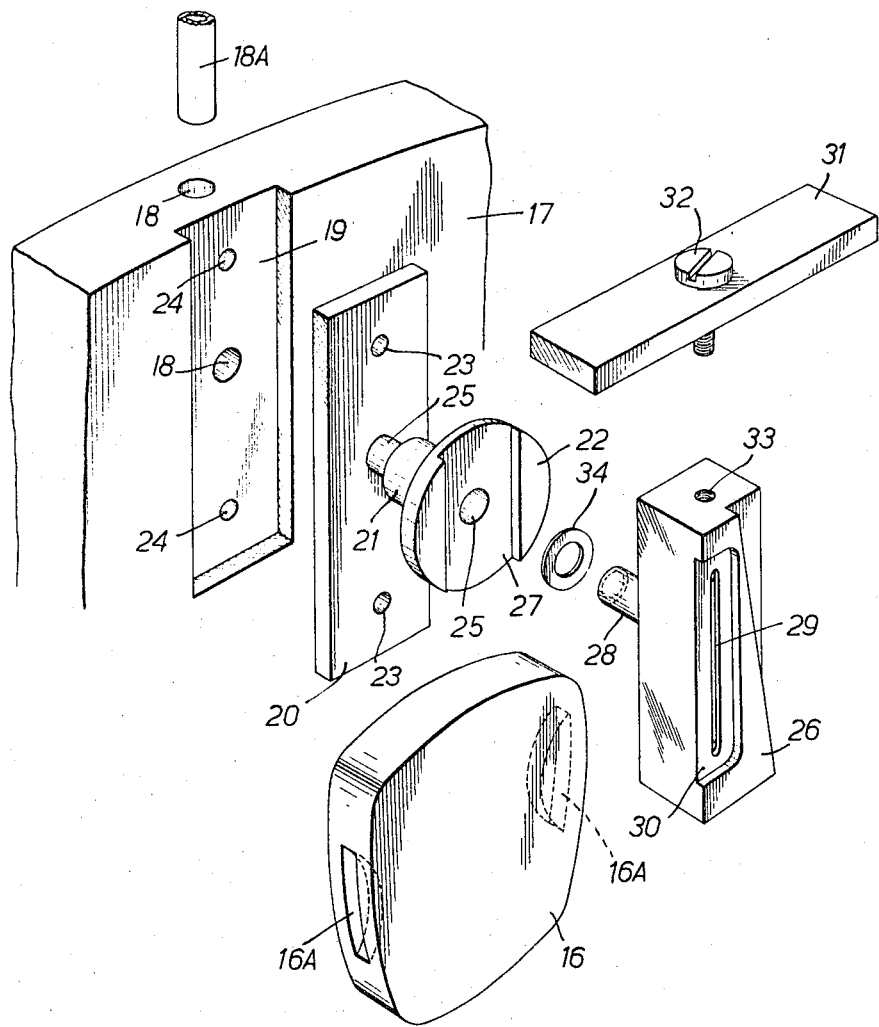
FIGURE 4 is an "exploded" view showing an alternative arrangement for the thrust pads of a bearing according to the invention with a special form of locating means for the lubricant feed and wiper means.

The alternative construction shown in "exploded" form in FIGURE 4 may be assumed to provide in front elevation a complete assembly similar to that shown in FIGURE 1 except for the details of construction of the lubricant feed and scraper devices and the consequential modifications to the carrier. In the construction shown in FIGURE 4 a series of thrust pads 16 will be arranged and secured to the carrier 17 by pins the heads of which engage the slots 16A in the sides of the pads in a similar manner to that in which the pads 2 are secured to the carrier 1 by pins 3 in FIGURES 1, 2 and 3. In FIGURE 4, however, the carrier 17 has no rim but is a flat plate having at radial positions between the thrust pads a series of oil supply passages 18 arranged to be supplied with oil from pipes 18A, one each of the passages 18 and pipes 18A being shown. Each passage 18 opens through the base of a radial recess 19 in the carrier 17, in which recess, in the assembled condition, is secured a plate 20 which carries one of the pins 21 the heads 22 of which engage, in this construction, the slots 16A in the sides of the pads.

The plate 20 is secured in its recess 19 by bolts passing through plain holes 23 in the plate and engaging screwthreaded holes 24 in the carrier.

Each of the pins 21 and plates 20 is provided with a feed passage 25 which communicates with the end of the passage 18 opening into the recess 19.

The combined wiper and oil supply means is of a similar type to that described with reference to FIGURES 1, 2 and 3 and comprises a member 26 having a base which engages a channel 27 in the head 22 of the pin 21 and is provided with an oil supply passage 28 which then communicates with the end of the passage 18 which opens into the recess 19, the oil delivery passage 28 communicating with an exit slot 29 in a recess 30 in the wiper face of the member 26 similar to the recess 12 in FIGURES 1, 2 and 3.

Since the carrier 17 in this construction is flat, a plate 31 is attached to each of the members 26 by a screw 32 engaging a screwthreaded hole 33 and serving to prevent outward radial movement of the pads 16. The joint between the pipe 28 and the passage 25 is conveniently sealed by a resilient washer 34 which may also be constructed and arranged to press the member 26 resiliently towards the thrust collar so as to maintain the wiper face of the member 26 in close contact with the thrust face of the thrust collar.

During operation of the construction shown respectively in FIGURES 1, 2 and 3, and in FIGURE 4, oil is delivered continuously through the slot 13 or 29 as the case may be so as to be directed towards the leading edge of the appropriate thrust pad 2 or 16. This oil, after passing between the working surface of the thrust pad and the thrust surface of the thrust collar and thus having had its temperature raised by hydrodynamic action, is then largely removed from the surface of the thrust collar by the wiper surface of the succeeding oil delivery and wiper member 6 or 26 and is directed by way of the radial channel 9 in FIGURE 1 and baffle plate 14 in FIGURE 1 or the corresponding radial channel in FIGURE 4 away from the bearing surface. Thus, the necessary oil for each thrust pad is supplied individually to the leading edge of such pad and a large proportion of the oil supplied to the leading edge of each pad is removed as it emerges from the trailing edge of that pad before it can travel to the next pad or can be circulated elsewhere in the bearing and thus cause losses due to turbulence and so-called "churning."

In some cases no special means may be provided such as the pipes 15, 15A, for leading away the oil wiped from the surface of the thrust collar by each wiper surface, this oil merely being discharged into a surrounding casing or, if no immediately surrounding casing is provided, into the space around the thrust bearing assembly.

Figure 5:
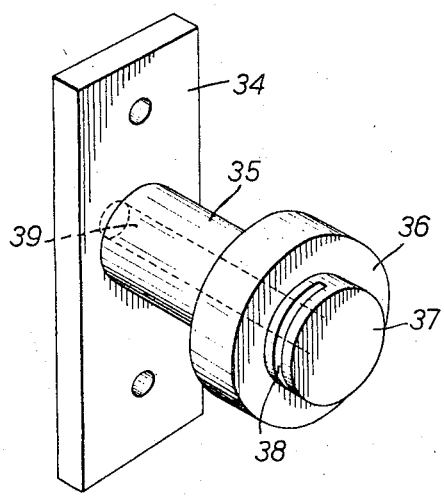
FIGURE 5 is a perspective view showing one way in which the locating pin may be used as the lubricant feed means in a thrust bearing according to the invention.
Figure 7:
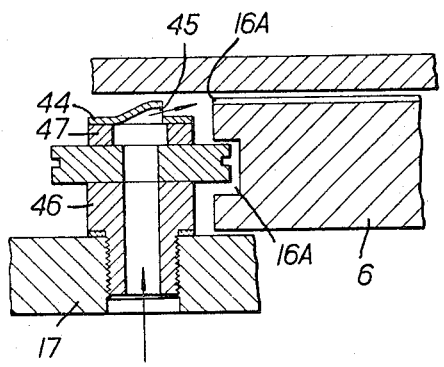

In the modification shown in FIGURE 5 the form of the carrier may be regarded as the same as that of the carrier 17 shown in FIGURE 4, while the form of the thrust pads would be similar to that of the thrust pad 16 shown in FIGURE 4, but, instead of the lubricant feed and scraper device and its associated parts as shown in FIGURE 4, the assembly comprising the plate 20, the pins 21, 22, the member 26 and the plate 31 is replaced by a plate 34 which fits into the recess 19 in the same manner as the plate 20, the plate 34 having secured to it a pin 35 having a head 36 formed and arranged to engage the appropriate slots 16A in the two adjacent pads 16 as indicated in FIGURE 7 and also provided with a projection 37 having an arcuate slot 38 in its circumferential surface communicating with a feed passage 39 extending through the pin 35 and the plate 34 and corresponding to the feed passage 25 in FIGURE 4, that is to say communicating with the passage 18 where the latter opens into the recess 19.

In the construction shown in FIGURE 5, therefore, during operation lubricant will be delivered from the passage 18 through the feed passage 39 and be ejected through the arcuate slot 38 in a fan-shaped jet extending throughout the length of the leading edge of the adjacent pad 16. No scraper means are provided in this construction.

Figure 6:
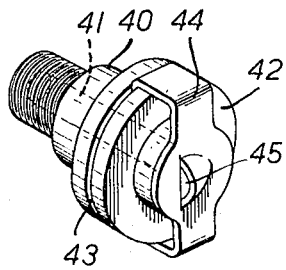
FIGURES 6 and 7 are respectively a perspective view and a cross-section showing modified arrangements of the same general character as that shown in FIGURE 5.

In the further modification shown in FIGURE 6 the general arrangement may be assumed to be similar to that described above with reference to FIGURE 5, but in this construction each of the pins which will be secured to a plate similar to the plate 34 is of the form shown at 40, being provided with an internal feed passage 41 opening through the outer face of the head 42 of the pin while the head 42 is provided with a circumferential groove 43 in which lie the two ends of a U-shaped spring clip or cap device 44 the centre part of which is provided with an aperture formed by pressing out one side of a slot in the cap device 44 as indicated at 45, the arrangement being such that lubricant delivered through the feed passage 41 is ejected from the slot in a fan-like jet similar in direction and type to the jet ejected through the slot 38 in FIGURE 5.

FIGURE 7 shows how a pin constructed and arranged as described with reference to FIGURE 5 or FIGURE 6 can serve the dual purpose of securing thrust pads 16 to the carrier, indicated generally at 17 and delivering liquid lubricant to the leading edge 16A of the appropriate thrust pad. As will be seen, the arrangement of the pin shown at 46 in FIGURE 7 differs slightly from the arrangement shown in FIGURE 6 in that there is interposed a washer 47, for example of neoprene or like resilient material, between the cap device 44 and the outer face of the head 42 of the pin 40.

What we claim as our invention and desire to secure by Letters Patent is:

1. A thrust bearing assembly comprising a support or carrier, an annular series of separate thrust pads mounted on the carrier and each capable of tilting about at least one axis relatively to the carrier, the working surfaces of which thrust pads constitute the bearing surface against which in use bears a cooperating annular bearing surface on a rotating thrust member, the leading and trailing edges of the working surfaces of adjacent thrust pads being separated circumferentially by spaces, and a lubricant supply device secured to the carrier member and disposed in each of said spaces, each said lubricant supply device having at least one ejection aperture for lubricating liquid spaced from the adjacent leading edge of the working surface of the appropriate one of the pads and arranged to eject a stream of lubricant towards substantially the whole length of such adjacent leading edge.

2. A thrust bearing assembly as claimed in claim 1, wherein each lubricant supply device has elongated ejecting aperture means extending in an approximately radial direction and arranged to deliver said lubricating liquid towards said leading edge of the working face of the appropriate adjacent pad.

3. A thrust bearing assembly as claimed in claim 2, including wiper means on each of said lubricant supply devices arranged to impede the transfer of lubricating liquid by the annular bearing surface of the thrust member from the adjacent trailing edge of one adjacent pad to the adjacent leading edge of the other adjacent pad.

4. A thrust bearing assembly as claimed in claim 3, wherein the wiper means is constituted by the edge of a wiper surface lying approximately in the plane of the bearing surface of the pads.

5. A thrust bearing assembly as claimed in claim 4, in which said wiper surface is the surface of a layer of white metal or other relatively soft bearing metal attached to a backing of harder metal.

6. A thrust bearing assembly as claimed in claim 4, wherein the wiper means includes at least one channel extending radially adjacent to the wiper edge and so disposed that the lubricating liquid which said edge wipes off the face of the annular bearing surface of the thrust member is caused to flow radially outwards away from the rotating part carrying the thrust member.

7. A thrust bearing assembly as claimed in claim 6, including a circumferentially disposed discharge pipe arranged to receive and carry away the liquid from said radially extending channels.

8. A thrust bearing assembly as claimed in claim 7, wherein said wiper edges extend in a radial direction having a circumferential component such that the liquid scraped off by them tends to be deflected radially outwards and including deflector plates disposed circumferentially around the series of thrust pads to receive said liquid and deflect it from the circumferential surfaces of the thrust pads.

9. A thrust bearing assembly as claimed in claim 1, including pins disposed between adjacent thrust pads and serving to retain said thrust pads on said carrier member, each stop pin being provided with an internal passage terminating in at least one of said ejection apertures whereby it constitutes one of said lubricant supply devices.

References Cited
UNITED STATES PATENTS 1,442,477  1/1923  Johnson _____ 308—160
3,243,242  3/1966  Hennessey _____ 308—160

MARTIN P. SCHWADRON, *Primary Examiner.*

FRANK SUSKO, *Examiner.*